US012785259B2

(12) United States Patent
Gonnet

(10) Patent No.: US 12,785,259 B2
(45) Date of Patent: Nov. 3, 2026

(54) GLAZED UNIT WITH ANTENNA PLATE AND METHOD FOR MANUFACTURING THIS GLAZED UNIT

(71) Applicant: SAINT-GOBAIN GLASS FRANCE, Courbevoie (FR)

(72) Inventor: Romain Gonnet, Lacroix Saint Ouen (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 316 days.

(21) Appl. No.: 18/572,656

(22) PCT Filed: Jun. 23, 2022

(86) PCT No.: PCT/EP2022/067217
§ 371 (c)(1),
(2) Date: Dec. 20, 2023

(87) PCT Pub. No.: WO2023/274845
PCT Pub. Date: Jan. 5, 2023

(65) Prior Publication Data

US 2024/0283141 A1 Aug. 22, 2024

(30) Foreign Application Priority Data

Jun. 30, 2021 (FR) ....................................... 2107060

(51) Int. Cl.
*H01Q 1/32* (2006.01)
*B60J 10/15* (2016.01)
(Continued)

(52) U.S. Cl.
CPC ............ *H01Q 1/3275* (2013.01); *B60J 10/15* (2016.02); *B60J 10/20* (2016.02); *H01Q 1/1271* (2013.01)

(58) Field of Classification Search
CPC ..... H01Q 1/3275; H01Q 1/1271; B60J 10/15; B60J 10/20
See application file for complete search history.

(56) References Cited

U.S. PATENT DOCUMENTS

2023/0391175 A1* 12/2023 Schreiber ................. B60J 7/022
2024/0200396 A1* 6/2024 Pardal ....................... B60J 10/70
2024/0283141 A1* 8/2024 Gonnet ..................... B60J 10/15

FOREIGN PATENT DOCUMENTS

DE 197 47 961 A1 5/1999
DE 10 2007 012486 A1 9/2008
(Continued)

OTHER PUBLICATIONS

International Search Report as issued in International Patent Application No. PCT/EP2022/067217, dated Aug. 19, 2022.

*Primary Examiner* — Faye M Fleming
(74) *Attorney, Agent, or Firm* — CUSHMAN PARTNERS LLC

(57) ABSTRACT

A vehicle glazed unit and method for manufacturing a glazed unit, this glazed unit including a glazed element, a molded seal portion attached to at least one edge of the glazed element with the exterior face of the molded seal portion in surface continuity with the exterior face of the glazed element, and an antenna plate having an attachment part which is integrated into the molded seal portion and an external part extending outside the molded seal portion, the exterior face of the antenna plate being in surface continuity with the exterior face of the molded seal portion.

13 Claims, 4 Drawing Sheets

(51) Int. Cl.
*B60J 10/20* (2016.01)
*H01Q 1/12* (2006.01)

(56) References Cited

FOREIGN PATENT DOCUMENTS

| | | | | | |
|---|---|---|---|---|---|
| EP | 2 468 544 | A1 | | 6/2012 | |
| FR | 3093030 | A1 | * | 8/2020 | .............. B60J 1/006 |

* cited by examiner

[Fig. 1]
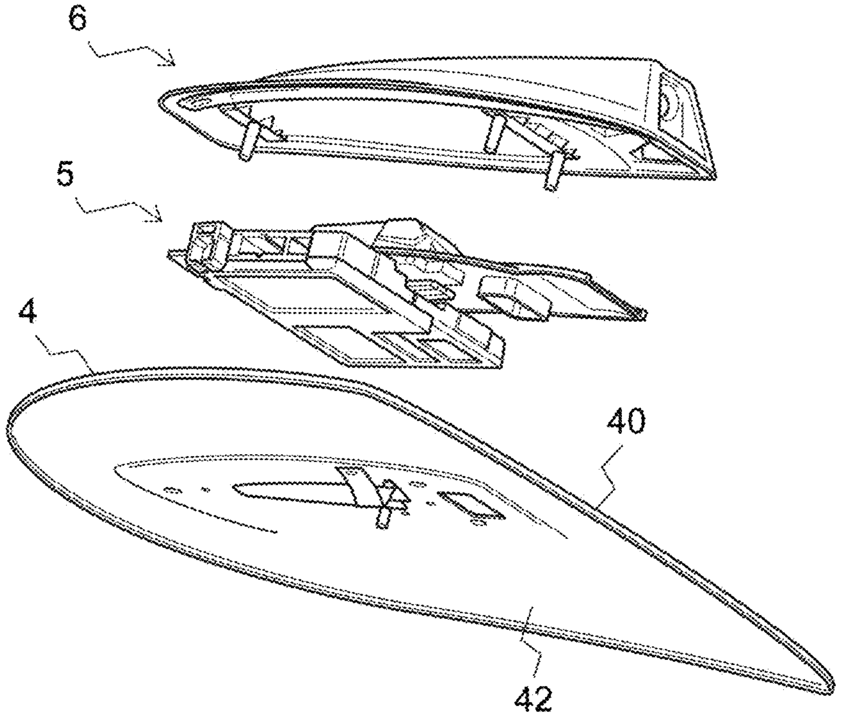
[Fig. 2]
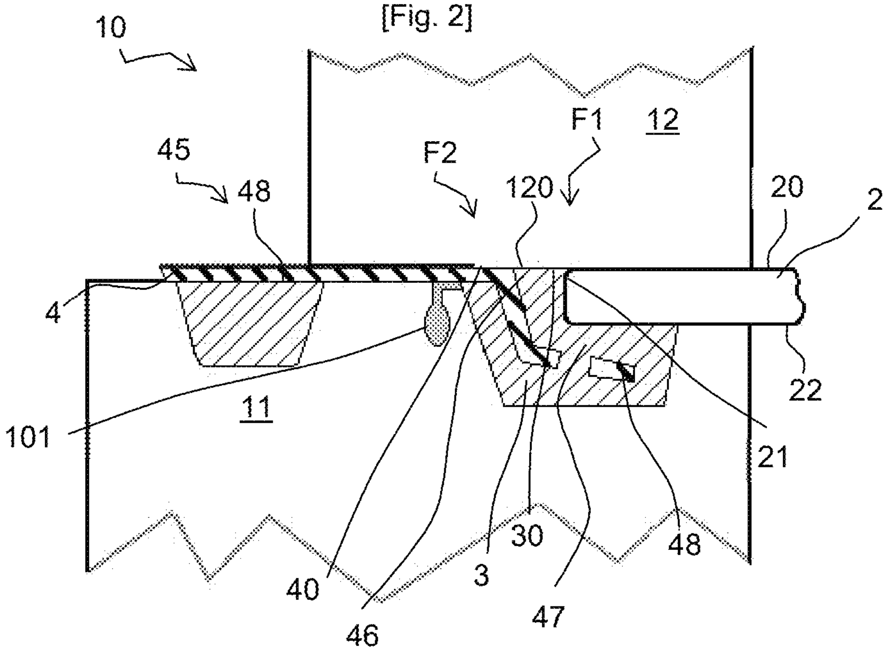

[Fig. 3]
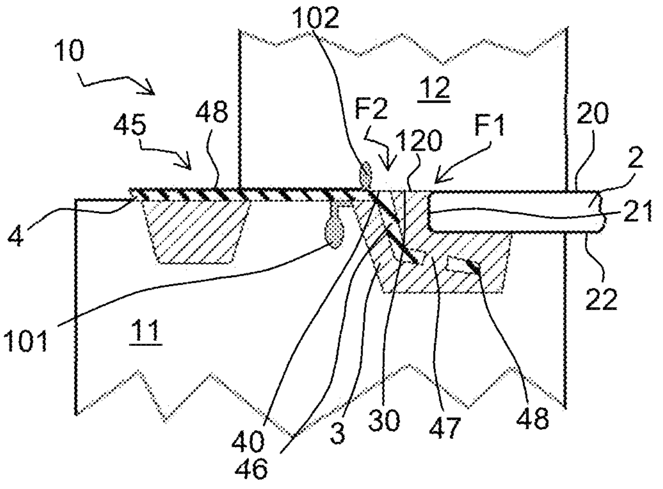
[Fig. 4]
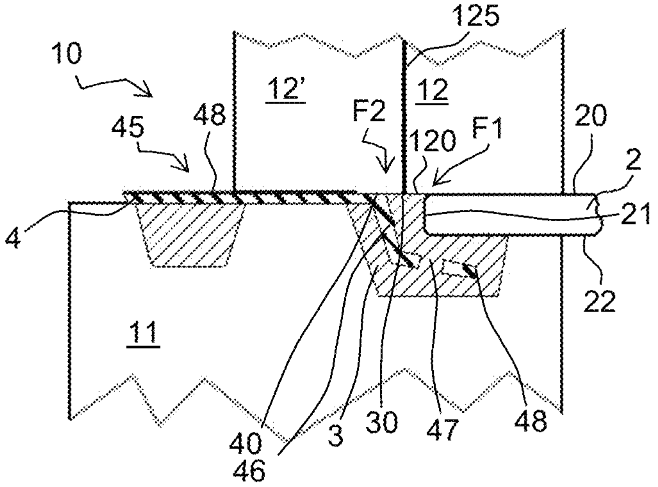

[Fig. 5]
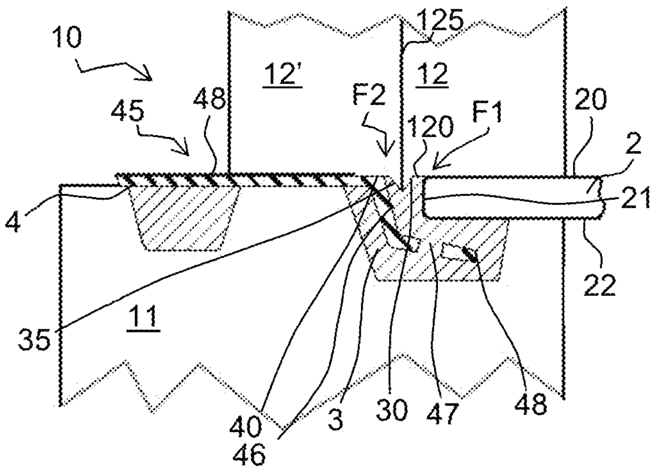
[Fig. 6]
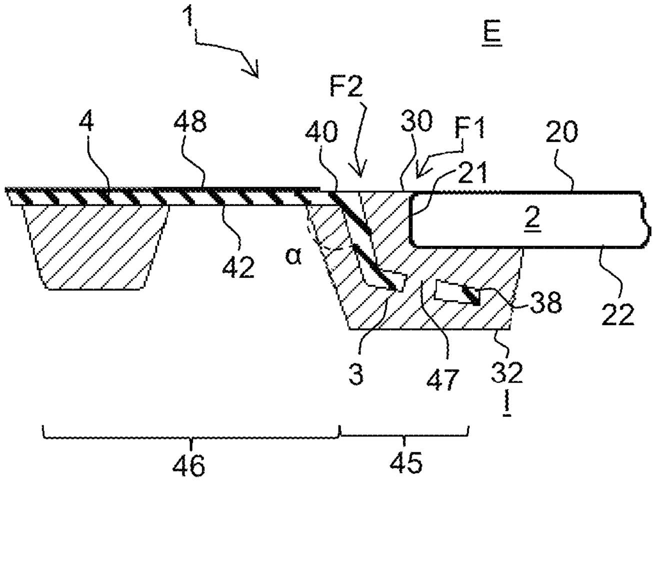

[Fig. 7]
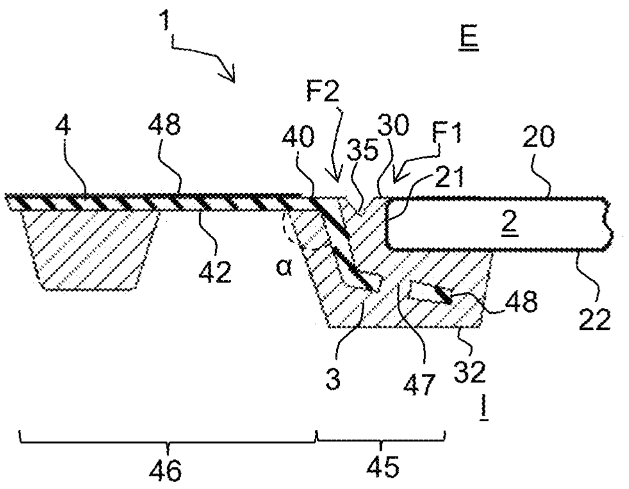

GLAZED UNIT WITH ANTENNA PLATE AND METHOD FOR MANUFACTURING THIS GLAZED UNIT

CROSS-REFERENCE TO RELATED APPLICATIONS

This application is the U.S. National Stage of PCT/EP2022/067217, filed Jun. 23, 2022, which in turn claims priority to French patent application number 2107060 filed Jun. 30, 2021. The content of these applications are incorporated herein by reference in their entireties.

TECHNICAL FIELD

The invention relates to a vehicle glazed unit, and in particular a roof glazed unit, including a glazed element, a molded seal portion and an antenna plate, as well as a method for manufacturing such a glazed unit.

The glazed element has an exterior face intended to be oriented toward an exterior space, an edge face and an interior face intended to be oriented toward an interior space.

The molded seal portion has an exterior face intended to be oriented toward said exterior space and an interior face intended to be oriented toward said interior space, said molded seal portion being attached to at least one edge of said glazed element with the exterior face of said molded seal portion in surface continuity with the exterior face of said glazed element.

The antenna plate has an exterior face intended to be oriented toward said exterior space and an interior face intended to be oriented toward said interior space and having an attachment part which is integrated into said molded seal portion and an external part extending outside said molded seal portion.

TECHNICAL BACKGROUND

Such glazed unit is known from the prior art in patent application No. DE102007012486.

When this configuration is observed in cross-section, at the location where the antenna plate penetrates the seal portion, the angle between the antenna plate and the molded seal portion is an acute angle. There is a clearance between the molded seal portion and the antenna plate.

This known configuration is not satisfactory because dirt may be caught at the location where the antenna plate penetrates into the molded seal portion.

Furthermore, an acute angle causes the emission of acoustic waves when the vehicle is moving.

SUMMARY OF THE INVENTION

Technical Problem

The present invention aims to propose a solution that facilitates the maintenance of the glazed unit and the maintenance of the vehicle.

In addition, the proposed solution improves penetration through the air and reduces aerodynamic noise from the prior configuration.

Solution to the Technical Problem

The present invention is based on the surprising discovery that it is possible to produce a double flush fit both of the molded seal portion with the glazed element as well as of the antenna plate with the seal portion, even though the glazed element and the antenna plate are two relatively solid elements which have different manufacturing tolerances and different expansion coefficients.

Furthermore, it is then possible to produce a recess in the exterior face of the tapered tip portion, the shape of which is suitable for removing water and dirt and reducing aerodynamic noise. It is thus possible to produce a recess in the exterior face of the tapered tip portion between the two flush parts, the angles of which are rounded.

The present invention relates to a vehicle glazed unit according to claim 1. This vehicle glazed unit may in particular be a roof glazed unit; it includes:

- a glazed element having an exterior face intended to be oriented toward an exterior space, an edge face and an interior face intended to be oriented toward an interior space,
- a molded seal portion having an exterior face intended to be oriented toward said exterior space and an interior face intended to be oriented toward said interior space, said molded seal portion being attached to at least one edge of said glazed element with the exterior face of said molded seal portion in surface continuity with the exterior face of said glazed element,
- an antenna plate having an exterior face intended to be oriented toward said exterior space and an interior face intended to be oriented toward said interior space and having an attachment part which is integrated into said molded seal portion and an external part extending outside said molded seal portion, this glazed unit being remarkable in that the exterior face of said antenna plate is in surface continuity with the exterior face of said molded seal portion.

The concept of surface continuity within the meaning of the present invention, or "flush", means that visually, from the exterior space, the two surfaces appear in continuity with one another. In practice, it is possible to measure a difference in height of up to 1 mm due to manufacturing tolerances. Although desired, a 0.0 mm value for 100% of the two flush-fits of the glazed units is not achievable in practice; as the person skilled in the art knows well.

When viewed in cross section, it is possible for the exterior face of said molded seal portion to be in the same surface continuity (even straight or curved) both with the exterior face of said glazed element as well as with the exterior face of said antenna plate.

The exterior face of said molded seal portion may have a step located between the glazed element and said external part of the antenna plate, in order to facilitate the manufacture of the glazed unit, said step preferably having a height of no more than 1 mm in order to facilitate the removal of water, dirt, and to reduce aerodynamic noise.

The exterior face of said molded seal portion may have a recess oriented toward said interior space and which is located between the glazed element and said external part of the antenna plate in order to allow the removal of water and dirt and to the reduction; said recess preferably having rounded angles in order to facilitate the removal of water, dirt, and to reduce aerodynamic noise. Said recess may be located closer to the external part of the antenna plate than to the glazed element.

In order to facilitate the implementation of the integration of the attachment part of said antenna plate inside said molded seal portion, it is possible for this attachment part of said antenna plate to extend essentially facing the edge face of the glazed element; it is possible for this attachment part of said antenna plate not to include a part oriented substantially parallel to the internal face of said glazed element; it is possible for this attachment part of said antenna plate not to extend facing the inner face of said glazed element.

Said attachment part has at least one, and preferably several, hole(s) to increase the mechanical anchoring of the attachment part in said molded seal portion.

The present invention also relates to a method for manufacturing a vehicle glazed unit, and in particular roof glazed unit, and in particular a glazed unit according to the invention, said glazed unit including:

- a glazed element having an exterior face intended to be oriented toward an exterior space, an edge face and an interior face intended to be oriented toward an interior space,
- a molded seal portion having an exterior face intended to be oriented toward said exterior space and an interior face intended to be oriented toward said interior space, said molded seal portion being attached to at least one edge of said glazed element with the exterior face of said molded seal portion in surface continuity with the exterior face of said glazed element,
- an antenna plate having an exterior face intended to be oriented toward said exterior space and an interior face intended to be oriented toward said interior space and having an attachment part which is integrated into said molded seal portion and an external part extending outside said molded seal portion, said method including a molding step wherein said glazed element is located in an encapsulation mold having a molding cavity corresponding to the shape of said molded seal portion, said method being remarkable in that, during said molding step, at least one mold part has an exterior molding face producing both the exterior face of said molded seal portion in surface continuity with the exterior face of said glazed element as well as the exterior face of said molded seal portion in surface continuity with the exterior face of said antenna plate.

Said molding face can be unique, that is to say in a single piece.

Said molding face may be in two contiguous parts, with a separation located in contact with the exterior face of said molded seal portion.

A part of said molding face in contact with the exterior face of said glazed element can then be made of metal or metal alloy and a part of said molding face in contact with the exterior face of said antenna plate can be in] made of a material having a Shore A hardness of between 45 and 90, or even between 55 and 85.

Said separation is preferably located in a recess oriented toward said interior space and which is located between the glazed element and said exterior part, so that the mark of the separation on the exterior face of the molded seal portion is more discreet, as appropriate.

Advantages of the Invention

By virtue of the double flush fit, there is a double surface continuity which prevents dirt from remaining as well as improves the aesthetics, air penetration and reduction of aerodynamic noise.

By virtue of the recess with rounded corners, the water and the dirt are correctly removed, and little noise is created when the vehicle moves forward.

Advantageously, the method according to the invention makes it possible to carry out a simple, reliable, and precise adaptation of the contours of the molding cavity to the various variations of curve necessarily found in a series of identical curved glazed units (same general bending, in order to close the same opening).

Advantageously, the invention can be implemented for a peripheral molded bead, that is, going completely around the window. Such a molded bead is particularly difficult to produce.

Advantageously, furthermore the invention makes it possible to use molds with a single molding cavity for the entire periphery of the glazed element.

BRIEF DESCRIPTION OF THE DRAWINGS

FIG. 1 is an exploded perspective view of an antenna for implementing the invention.

FIG. 2 is a partial cross-sectional view of a first variant of a mold for the integration of an antenna according to the invention.

FIG. 3 is a partial cross-sectional view of a second variant of a mold for the integration of an antenna according to the invention.

FIG. 4 is a partial cross-sectional view of a third variant of a mold for the integration of an antenna according to the invention.

FIG. 5 is a partial cross-sectional view of a fourth variant of a mold for the integration of an antenna according to the invention.

FIG. 6 is a partial cross-sectional view of a first embodiment of a glazed unit according to the invention.

FIG. 7 is a partial cross-sectional view of a second embodiment of a glazed unit according to the invention.

DETAILED DESCRIPTION OF VARIANTS OF THE INVENTION AND EMBODIMENTS OF THE INVENTION

The vehicle glazed unit 1 consists of at least one glazed element 2, a molded seal portion 3, as well as an antenna plate 4.

The glazed unit 1 is intended to close an opening, and in particular an opening of a vehicle roof, by producing a separation between an exterior space E which is outside the vehicle and an interior space I, which is inside the vehicle. The glazed element 2 thus has an exterior face 20 intended to face toward the exterior space E, an interior face 22 intended to face toward the interior space I, and a peripheral edge face 21 located between these two faces.

The glazed element 2 may be monolithic, meaning it is made up of a single sheet of material, or it may be composite, meaning it is made up of several sheets of material between which at least one layer of adhesive material is inserted in the case of laminated glazed units, or between which there is at least one interlayer space in the case of multiple glazed units (double glazed units, triple glazed units, etc.). The sheet(s) of material may be mineral, particularly made of glass, or organic, particularly made of plastic material.

The molded seal portion 3 has an exterior face 30 intended to be oriented toward the exterior space E and an interior face 32 intended to be oriented toward the interior space I. The molded seal portion 3 is attached both to an edge of the glazed element 2 and to an edge of the antenna plate 4.

Since the antenna plate 4 has an exterior face 40 intended to be oriented toward the exterior space E and an interior face 42 intended to be oriented toward the interior space I, the antenna plate 4 has two parts: an attachment part 45 which is integrated into the molded seal portion 3 (it is molded into this molded seal portion) and an external part 46 extending outside said molded seal portion 3 and allowing the attachment of an electronic cell 5 and a protective cover 6.

In the case of a vehicle glazed unit, the glazed unit generally has, at least partially at its periphery, a decorative strip, not shown here. This decorative strip is generally formed by a deposit of enamel formed on the interior face of the glazed element if the latter is monolithic, or on an intermediate face of the glazed unit in the case of composite glazed units, but it may also be produced by partial and/or peripheral coloring of a sheet of material used, notably a sheet of organic material.

As can be seen in the cross-sectional views of FIGS. 2 to 5, the molded seal portion 3 is manufactured by implementing a manufacturing method called "encapsulation", because it includes a step of molding the molded portion in a molding device 10 including a mold comprising at least one fixed mold part 11 and at least one movable mold part 12, or even several movable mold parts 12, 12', which is (or which are) movable relative to the fixed mold part, said mold parts cooperating in the closed state of the mold, during the molding step, with the glazed element 2 and the antenna plate 4 to form a molding cavity having in cross-section the shape of the mold of the molded portion 3.

The molding device 10 further includes means for opening and closing the mold, as well as means for applying pressure to the mold during the injection of the material forming the molded seal portion into the molding cavity; these means are not illustrated here.

To manufacture the molded seal portion by molding, the glazed element 1 is positioned in a mold part, here the lower fixed mold part 11, then an upper mold part 12, 12', is positioned onto the fixed mold part 11 in order to form the molding cavity in the closed space between these two mold parts.

The edge of the glazed element thus penetrates into the molding cavity in order to be able to mold the molded seal portion at the periphery of the glazed element 2.

The opening and closing movement of the mold, that is to say the movement of the movable mold part 12, 12' relative to the fixed mold part 11, is here a movement in the vertical direction, but this movement could also be in the horizontal direction or in any other direction, optionally curved.

The plastic material constituting the molded seal portion is injected into the molding cavity via at least one injection port (not shown).

Because the glazed element 2 is not flat but curved (although this is not visible in the figures), there is a problem of adapting the glazed elements 2 in the mold for the same series of glazed units. Indeed, the technologies which make it possible to produce a curved glazed element, and in particular the technique for bending mineral glass sheet(s), do not make it possible to guarantee an absolute reproducibility of the curve from one glazed element to another within a series. There is always a manufacturing tolerance, which is at best of the order of 1.0 or even 1.5 millimeters, depending on the size of the glazed element.

A suction system is located in the fixed mold part; this suction system creates a depression between two seals and during the injection of the plastic material in order to allow the glazed element to be kept in place in the mold.

As can be seen in FIGS. 2 to 5, when the mold is closed, the periphery of the mold cavity is defined, in its lower part:

- by a part of the inner face of the fixed mold part 11, that which is intended to form the inner face 32 of the molded seal portion,
- by a part of the interior face 42 of the antenna plate, and
- by the edge face 21 of the glazed element and a part of the peripheral edge of the interior face 22 of the glazed element, and in its upper part:

- by a part of the inner face of the mold moving part(s) 12, 12', that is (are) intended to form the exterior face 30 of the molded seal portion,
- by a part of the exterior face 40 of the antenna plate, and
- by a part of the peripheral edge of the exterior face 20 of the glazed element.

The molding cavity also includes the attachment part 45 which is intended to be integrated into the molded seal portion 3. Preferably, this part does not touch the walls of the molding cavity in order to facilitate the filling of this molding cavity. It thus has an end 48 which is completely incorporated into the molded seal portion 3.

Thus, in the variants of FIGS. 2 to 5, the method includes a molding step wherein the glazed element 2 is located in the encapsulation mold 10 which has the molding cavity corresponding to the shape of the molded seal portion 3, and, during this molding step, the part or the movable mold part 12, 12' has an exterior molding face 120 forming the exterior face 30 of the molded seal portion 3 both in surface continuity F1 with the exterior face 20 of the glazed element 2 as well as in surface continuity F2 with the exterior face 40 of the antenna plate 4.

Thus, this is to produce a double surface continuity, or a double flush fit.

During the injection of the material into the molding cavity, the fixed mold part 11 carries out a counter-support directly for the glazed element 2 and indirectly for the antenna plate 4, by virtue of a seal 101.

In FIGS. 2 and 3, the molding face 120 is in a single piece; it is therefore unique for the encapsulation mold 10.

In FIG. 2, the movable mold part 12 bears directly against the glazed element 2 and the antenna plate 4.

In FIG. 3, the movable mold part 12 bears indirectly against the antenna plate 4, thanks to a seal 102.

Each seal 101, 102 may be of the type described in international patent application No. WO2018/002502.

In FIGS. 4 and 5, the molding face 120 is not a single piece but is in two contiguous parts, thus with a separation 125 that is located in contact with the exterior face 30 of said molded seal portion 3, between the two surface continuities F1 and F2. The separation 125 is located at least 3 mm from each surface continuity F1 and F2 in order to limit the risk of generating a defect at the location of these surface continuities F1 and F2.

In FIGS. 4 and 5, the movable mold part 12 bears directly against the glazed element 2 and the movable mold part 12' bears directly on the antenna plate 4.

A part of the molding face 120 in contact with the exterior face 20 of the glazed element 2 is made of metal or metal alloy (for example steel) and a part of the molding face 120 in contact with the exterior face 40 of the antenna plate 4 is made of a material having a Shore A hardness of between 45 and 90, or even between 55 and 85; it may for example be made of Hytrel, registered trademark of Dupont.

In FIG. 5, the exterior face 30 of the molded seal portion 3 has a recess 35 oriented toward the interior space I and which is located between the glazed element 2 and the exterior part 46 and the separation 125 is located in this recess 35, preferably at the bottom of this recess.

FIGS. 6 and 7 show a glazed unit 1 obtained by implementing the method according to the invention. The exterior face 30 of the molded seal portion 3 is in surface continuity F1 with the exterior face 20 of the glazed element 2 as well as in surface continuity F2 with the exterior face 40 of the antenna plate 4.

The external part 46 is a plate having an edge that is located facing the edge face 21 of the glazed element 2, with the material of molded seal portion 3 interposed between two. The edge of the external part 46 is thus in surface continuity with the molded seal portion 3.

The attachment part 45 extends from the external part 46 at an angle α, preferably greater than 90° and here 110°. It extends inside the molded seal portion 3 and is here completely integrated into the molded seal portion 3. Here, it has a hole 47 through which the material of the molded seal portion 3 penetrates during the molding step. This hole 47 is thus filled with the material of the molded seal portion 3 and increases the attachment of the attachment part 45 in the molded seal portion 3.

In FIG. 6, the exterior face 30 of the molded seal portion 3 is flat; this embodiment corresponds to the glazed unit obtained by implementing one of the variants of FIGS. 2 to 4.

In FIG. 7, the exterior face 30 of the molded seal portion 3 has a recess 35 oriented toward the interior space I and which is located between the glazed element 2 and the exterior part 46 for the removal of water and dirt. The edges and the bottom of this recess 35 are not acute angles but have rounded corners to facilitate the removal of water and dirt. This corresponds to the glazed unit obtained by implementing the variant of FIG. 5.

The invention claimed is:

1. A vehicle glazed unit, comprising:

a glazed element having an exterior face intended to be oriented toward an exterior space, an edge face and an interior face intended to be oriented toward an interior space, a molded seal portion having an exterior face intended to be oriented toward said exterior space and an interior face intended to be oriented toward said interior space, said molded seal portion being attached to at least one edge of said glazed element with the exterior face of said molded seal portion in surface continuity with the exterior face of said glazed element, an antenna plate having an exterior face intended to be oriented toward said exterior space and an interior face intended to be oriented toward said interior space and having an attachment part which is integrated into said molded seal portion and an external part extending outside said molded seal portion, wherein the exterior face of said antenna plate is in surface continuity with the exterior face of said molded seal portion.

2. The glazed unit according to claim 1, wherein the exterior face of said molded seal portion has a recess oriented toward said interior space and which is located between the glazed element and said exterior part.

3. The glazed unit according to claim 1, wherein said attachment part has at least one hole.

4. A method for manufacturing a vehicle glazed unit according to claim 1, said glazed unit including:

a glazed element having an exterior face intended to be oriented toward an exterior space, an edge face and an interior face intended to be oriented toward an interior space, a molded seal portion having an exterior face intended to be oriented toward said exterior space and an interior face intended to be oriented toward said interior space, said molded seal portion being attached to at least one edge of said glazed element with the exterior face of said molded seal portion in surface continuity with the exterior face of said glazed element, an antenna plate having an exterior face intended to be oriented toward said exterior space and an interior face intended to be oriented toward said interior space and having an attachment part which is integrated into said molded seal portion and an external part extending outside said molded seal portion, said method comprising a molding step wherein said glazed element is located in an encapsulation mold having a molding cavity corresponding to the shape of said molded seal portion, wherein, during said molding step, at least one mold part has an exterior molding face producing both the exterior face of said molded seal portion in surface continuity with the exterior face of said glazed element as well as the exterior face of said molded seal portion in surface continuity with the exterior face of said antenna plate.

5. The method according to claim 4, wherein said molding face is unique.

6. The method according to claim 4, wherein said molding face is in two contiguous parts, with a separation located in contact with the exterior face of said molded seal portion.

7. The method according to claim 6, wherein a part of said molding face in contact with the exterior face of said glazed element is made of metal or metal alloy and a part of said molding face in contact with the exterior face of said antenna plate is made of a material having a Shore A hardness of between 45 and 90.

8. The method according to claim 6, wherein said separation is located in a recess oriented towards said interior space.

9. The glazed unit according to claim 1, wherein the glazed unit is a roof glazed unit.

10. The glazed unit according to claim 2, wherein said recess has rounded angles.

11. The glazed unit according to claim 3, wherein said attachment part has several holes.

12. The method according to claim 4, wherein the vehicle glazed unit is a roof glazed unit.

13. The method according to claim 7, wherein the Shore A hardness is between 55 and 85.

* * * * *